(12) United States Patent
Ju et al.

(10) Patent No.: US 12,367,210 B2
(45) Date of Patent: Jul. 22, 2025

(54) DATA QUERY METHOD BASED ON ON-LINE ANALYTICAL PROCESSING, ELECTRONIC DEVICE AND STORAGE MEDIUM

(71) Applicant: Beijing Volcano Engine Technology Co., Ltd., Beijing (CN)

(72) Inventors: Kejian Ju, Beijing (CN); Leilei Hu, Beijing (CN); Yuanpu Ding, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/912,475

(22) Filed: Oct. 10, 2024

(65) Prior Publication Data
US 2025/0131006 A1   Apr. 24, 2025

(30) Foreign Application Priority Data
Oct. 24, 2023  (CN) .......................... 202311387187.0

(51) Int. Cl.
*G06F 16/25*   (2019.01)
*G06F 16/22*   (2019.01)
*G06F 16/245*  (2019.01)

(52) U.S. Cl.
CPC .......... *G06F 16/254* (2019.01); *G06F 16/221* (2019.01); *G06F 16/245* (2019.01)

(58) Field of Classification Search
CPC ...... G06F 16/22; G06F 16/221; G06F 16/254; G06F 16/245
See application file for complete search history.

(56) References Cited

U.S. PATENT DOCUMENTS 6,016,497 A * 1/2000 Suver ................... G06F 16/284
                                                          707/999.102
8,782,100 B2 * 7/2014 Yoon .................... G06F 16/283
                                                          707/790

(Continued)

FOREIGN PATENT DOCUMENTS

CN    103440245 A       12/2013
CN    104572893 A   *    4/2015

(Continued)

OTHER PUBLICATIONS

"Row-store, column-store, and row-column storage"; https://www.jianshu.com/p/7ee1f9703a41; Jianshu; Mar. 2020; accessed Oct. 18, 2024; 16 pages.

*Primary Examiner* — James E Richardson
(74) *Attorney, Agent, or Firm* — BakerHostetler

(57) ABSTRACT

Embodiments of the present disclosure provide a data query method based on on-line analytical processing, an electronic device and a storage medium. The method includes: receiving a first query request, and determining a request type of the first query request; executing a query in a row-based storage portion of an event table of a database in response to the request type being a preset type; and generating a query result based on retrieved target data, wherein the event table includes a column-based storage portion and the row-based storage portion, and the column-based storage portion includes a plurality of data rows; and the row-based storage portion includes a coding column, and each piece of coded information in the coding column includes row data belonging to a same data row in the column-based storage portion.

19 Claims, 3 Drawing Sheets

(56) References Cited

U.S. PATENT DOCUMENTS

| | | | | |
|---|---|---|---|---|
| 2013/0198168 A1* | 8/2013 | Huang | ................ | G06F 16/245 |
| | | | | 707/769 |
| 2014/0012881 A1* | 1/2014 | Roesch | ................ | G06F 16/217 |
| | | | | 707/792 |
| 2014/0172776 A1* | 6/2014 | Liu | ................ | G06F 16/221 |
| | | | | 707/600 |
| 2016/0253382 A1* | 9/2016 | Shadmon | ............ | G06F 16/2453 |
| | | | | 707/718 |
| 2019/0294615 A1* | 9/2019 | Plattner | ................ | G06F 16/217 |
| 2020/0334254 A1* | 10/2020 | Arye | ................... | G06F 16/2393 |
| 2021/0200736 A1* | 7/2021 | Luo | ................ | G06F 16/254 |
| 2021/0216498 A1* | 7/2021 | Congnan | ............... | G06F 16/221 |

FOREIGN PATENT DOCUMENTS

| | | | | |
|---|---|---|---|---|
| CN | 104572893 B | | 2/2018 | |
| CN | 115599790 A | * | 1/2023 | ............ G06F 16/22 |

* cited by examiner

| Version | Column num | Null bitset | Col1 value | Col2 value | Col3 value |
|---|---|---|---|---|---|
| 1 | 3 | 0x0111 | "a" | 2 | 2.222 |

| Version | Column num | Null bitset | Col1 value | Col3 value |
|---|---|---|---|---|
| 1 | 3 | 0x0101 | "a" | 2.222 |

| Version | Column num | Null | Col1 length | Col2 length | Col3 length | Col1 value | Col2 value | Col3 value |
|---|---|---|---|---|---|---|---|---|
| 1 | 3 | 0x0111 | 2 | 4 | 4 | ab | 2 | 2.222 |

DATA QUERY METHOD BASED ON ON-LINE ANALYTICAL PROCESSING, ELECTRONIC DEVICE AND STORAGE MEDIUM

CROSS-REFERENCE TO RELATED APPLICATION(S)

This application claims the priority of Chinese Patent Application No. 202311387187.0 filed on Oct. 24, 2023, and the disclosure of the above-mentioned Chinese Patent Application is hereby incorporated in its entirety by reference as a part of this application.

TECHNICAL FIELD

The present disclosure relates to the field of computer technologies, and in particular, to a data query method based on on-line analytical processing, an electronic device and a storage medium.

BACKGROUND

With the development of computers, a user may use an electronic device to implement various functions. For example, the user may store and analyze data by means of the electronic device.

In some scenarios, on-line analytical processing (OLAP) supports complex analytical operations, focuses on decision support, and provides intuitive query results. The OLAP is an important application of a data warehouse system.

SUMMARY

This section of the present disclosure is provided to give a brief overview of concepts, which will be described in detail later in the section of Detailed Description. This section of the present disclosure is not intended to identify key features or essential features of the claimed technical solution, nor is it intended to limit the scope of the claimed technical solution.

According to a first aspect, an embodiment of the present disclosure provides a data query method based on on-line analytical processing. The method includes: receiving a first query request, and determining a request type of the first query request; executing a query in a row-based storage portion of an event table of a database in response to the request type being a preset type; and generating a query result based on retrieved target data, wherein the event table includes a column-based storage portion and the row-based storage portion, and the column-based storage portion includes a plurality of data rows; and the row-based storage portion includes a coding column, and each piece of coded information in the coding column includes row data belonging to a same data row in the column-based storage portion.

According to a second aspect, an embodiment of the present disclosure provides a data query apparatus based on on-line analytical processing. The apparatus includes: a receiving unit configured to receive a first query request, and determine a request type of the first query request; a first query unit configured to execute a query in a row-based storage portion of an event table of a database in response to the request type being a preset type; and a generation unit configured to generate a query result based on retrieved target data, wherein the event table includes a column-based storage portion and the row-based storage portion, and the column-based storage portion includes a plurality of data rows; and the row-based storage portion includes a coding column, and each piece of coded information in the coding column includes row data belonging to a same data row in the column-based storage portion.

According to a third aspect, an embodiment of the present disclosure provides an electronic device. The electronic device includes: one or more processors; and a storage device configured to store one or more programs, wherein the one or more programs, when executed by the one or more processors, cause the one or more processors to implement the data query method based on on-line analytical processing according to the first aspect.

According to a fourth aspect, an embodiment of the present disclosure provides a non-transient computer-readable storage medium having a computer program stored thereon, wherein when the program is executed by a processor, the steps of the data query method based on on-line analytical processing according to the first aspect are implemented.

BRIEF DESCRIPTION OF DRAWINGS

The foregoing and other features, advantages, and aspects of embodiments of the present disclosure will become more apparent with reference to the following specific implementations and in conjunction with the accompanying drawings. Throughout the drawings, the same or similar reference numerals denote the same or similar elements. It should be understood that the accompanying drawings are schematic and that parts and elements are not necessarily drawn to scale.

DETAILED DESCRIPTION

Figure 1:
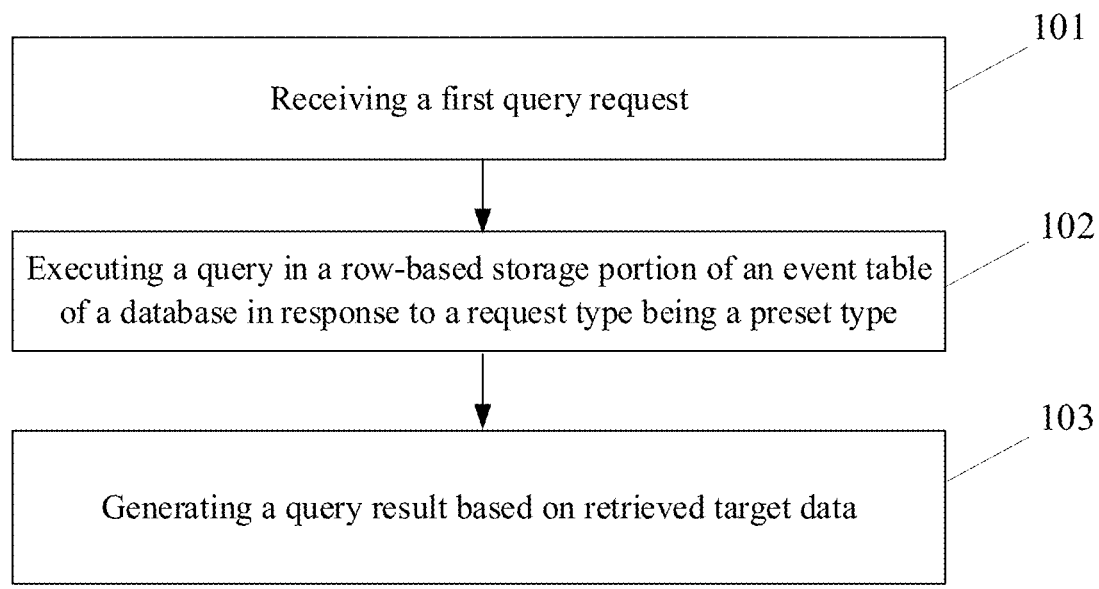
FIG. 1 is a flowchart of a data query method based on on-line analytical processing according to an embodiment of the present disclosure.

The embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for purpose of illustration, and are not intended to limit the scope of protection of the present disclosure.

It should be understood that the various steps described in the method implementations of the present disclosure may be performed in different orders, and/or performed in parallel. Furthermore, additional steps may be included and/or the execution of the illustrated steps may be omitted in the method implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of other terms will be given in the description below.

It should be noted that concepts such as "first" and "second" mentioned in the present disclosure are only used to distinguish different devices, modules, or units, and are not used to limit the sequence of functions performed by these devices, modules or units, or interdependence thereof.

It should be noted that the modifiers "one" and "a plurality of" mentioned in the present disclosure are illustrative and not restrictive, and those skilled in the art should understand that unless the context clearly indicates otherwise, the modifiers should be understood as "one or more".

The names of messages or information exchanged between a plurality of devices in the implementations of the present disclosure are used for illustrative purposes only, and are not used to limit the scope of these messages or information.

In one or more embodiments of the present disclosure, an access method based on row-column mixed storage is provided, to guarantee a hybrid scenario of high-frequency point queries, point updates and range scans. In some scenarios, OLAP databases mainly are systems used for real-time data analysis. Due to the application thereof to many aggregation and association analysis scenarios, and in consideration of a storage compression rate, most of the OLAP databases store data in a form of column-based storage. The column-based storage has a higher compression rate and facilitates vectorized processing of column data. However, in some other scenarios of high-frequency updates and high-frequency point queries, when the column-based storage is adopted, a complete column needs to be obtained and then a file may need to be read randomly, which greatly reduces the reading efficiency.

In one or more embodiments of the present disclosure, a database may include a database front end (FE), a database back end (BE), and a storage table. The FE, which serves as an access layer, may be responsible for receiving an SQL statement, parsing the SQL statement, generating an execution plan, and executing scheduling and result collection. The BE is an execution layer of the database, and in a storage-compute decoupling scenario, the BE serves as a computation execution node which does not store data. The storage table may be used to store data. When a client submits a query request, the FE can determine, based on the request type of the query request, whether a short path or a normal path is to be executed. In a short query path, some operations in set query and analysis parts may be skipped, and after an RPC request is sent to the BE, a queue is directly synchronized to accept an answer, without participating in task scheduling of the BE.

In one or more embodiments of the present disclosure, during reading or writing of data, a choice is made between the row-based storage, the column-based storage, and the row-column mixed storage based on whether a scenario for the request is the point query or the scan. In addition, a MemTable+WAL mechanism is introduced to ensure the writing performance and the query performance. That is, during the writing, a WAL file is preferentially written, and a return may be performed at the end of the writing of WAL, thereby improving the QPS of the writing; and the MemTable can also be used for sorting in a memory during the writing and caching during the query.

In one or more embodiments of the present disclosure, it may be determined, based on the query complexity of the query request (for example, an estimation as to whether a size of a query result is less than 1 k, or whether there is a shuffle operator in a query statement), whether to execute the short path. By way of example, a determination condition for the query complexity may include one or more of the following: an equivalence query for primary key; in a case of a plurality of primary keys, a Cartesian product of the primary keys being suitable for a point query scenario; a small-range query for primary key; a combination of a small-range query and a point query scenario for primary key; and update, delete, and insert operations that are bound to a query and satisfy several determination conditions above. For the short path, a cached plan may be searched for, firstly, in the FE. After being determined, the plan is directly sent to a BE. A method for selecting the BE to which the plan is sent may include: on the FE side, pruning a tablet, and then determining the BE node by means of an expression and metadata prune of the tablet. In the BE, instead of a pipelined scheduling model, a synchronized RPC execution process is executed, and a point query and point update interface (such as get, muli_get, scan, batch_scan, delete, or batch_delete) that directly operates data may be provided for a mixed storage table, so as to reduce scheduling overheads.

In one or more embodiments of the present disclosure, an encoding method may be provided to encode data stored in a column-based manner into a separate coding column. By way of example, the coding column may include a data header and a field value. The data header may include a column number and a bitmap, where the column number is configured to indicate the number of field values in the row data, and the bitmap is configured to indicate a location of a null value in data rows. The data header may further include field lengths respectively corresponding to fields to which the row data belongs, so that during column prune, an offset is determined based on the field lengths, to implement data skip-reading. In addition, for the field value as a positive number, it is stored by using complement code, and for the field value as a negative number, it is stored by using original code. For a signed field value, an exclusive-OR operation is performed on its sign bit and 1, to ensure that the positive number is greater than the negative number during persistence, thereby ensuring data orderliness.

In one or more embodiments of the present disclosure, a multi-level cache mechanism may be provided. For example, a query plan is cached, which may be applied to a case where a type of a query request remains unchanged and its condition parameter changes, so as to reduce the amount of computation used for generating the query plan on the FE side and increasing the speed of determining the query plan. For example, data is cached, and the cached data may include a cached primary key and a cached primary key value.

In one or more embodiments of the present disclosure, a metadata decoupling mechanism may be provided. In the metadata decoupling mechanism, a metadata management, which is originally done in the FE, is transferred to a storage space outside the FE, thereby releasing a restrictive relationship between master and slave nodes of the FE. Therefore, information having a status can be stored outside the master and slave nodes of the FE, so that the query request does not need to be bound to the FE, and in a scenario of high-frequency operations (such as insert or update operations), there is no bottleneck limitation in the performance of the FE, thereby improving the operation efficiency.

In one or more embodiments of the present disclosure, the OLAP is not limited to a specific database, and may be Doris/StarRocks/Clickhouse, etc.

Referring to FIG. 1, it illustrates a process of an embodiment of a data query method based on on-line analytical processing according to the present disclosure. As shown in FIG. 1, the data query method based on on-line analytical processing includes the following steps.

Step 101, receiving a first query request, and determining a request type of the first query request.

In this embodiment, an execution subject (such as a server and/or a terminal device) of the data query method based on on-line analytical processing may receive the first query request and determine the request type of the first query request.

In some scenarios, a database front end (FE) of the database, which may serve as an access layer, may receive an SQL statement from a client of a user, parse the SQL statement, and generate an execution plan. The database front end (FE) may determine the request type of the first query request.

Step 102, executing a query in a row-based storage portion of an event table of a database in response to the request type being a preset type.

Here, if the request type of the first query request is the preset type, a query may be executed in the row-based storage portion of the event table of the database.

The preset type may be a type set in advance, and the specific preset type may be set according to an actual application scenario, which is not limited herein.

In some embodiments, the preset type may be a type with a low estimated query complexity. As an example, the preset type of request may include: an equivalent query for primary key; in a case of a plurality of primary keys, a Cartesian product of the primary keys being suitable for a point query scenario; a small-range query for primary key; a combination of a small-range query for primary key and a point query scenario; and update, delete, and insert operations that are bound to a query and satisfy several determination condition above.

Here, the event table includes a column-based storage portion and a row-based storage portion, and the column-based storage portion includes a plurality of data rows; and the row-based storage portion includes a coding column, and each piece of coded information in the coding column includes row data belonging to a same data row in the column-based storage portion.

Here, the event table may include data stored in a row-based manner and data stored in a column-based manner. Row-based storage may indicate that data is organized in rows. In contrast, column-based storage may indicate that data is organized in columns.

Herein, the event table may adopt column-based storage. The coding column includes coded information, and each cell of the coding column may be regarded as one piece of coded information. The coded information may include a field value of the column-based storage portion. When the coding column is stored in a column-based manner, data belonging to a same row may actually be stored adjacent to each other, i.e., the row-based storage is implemented substantially. In other words, the row-based storage is implemented under the column-based storage.

Figure 2:
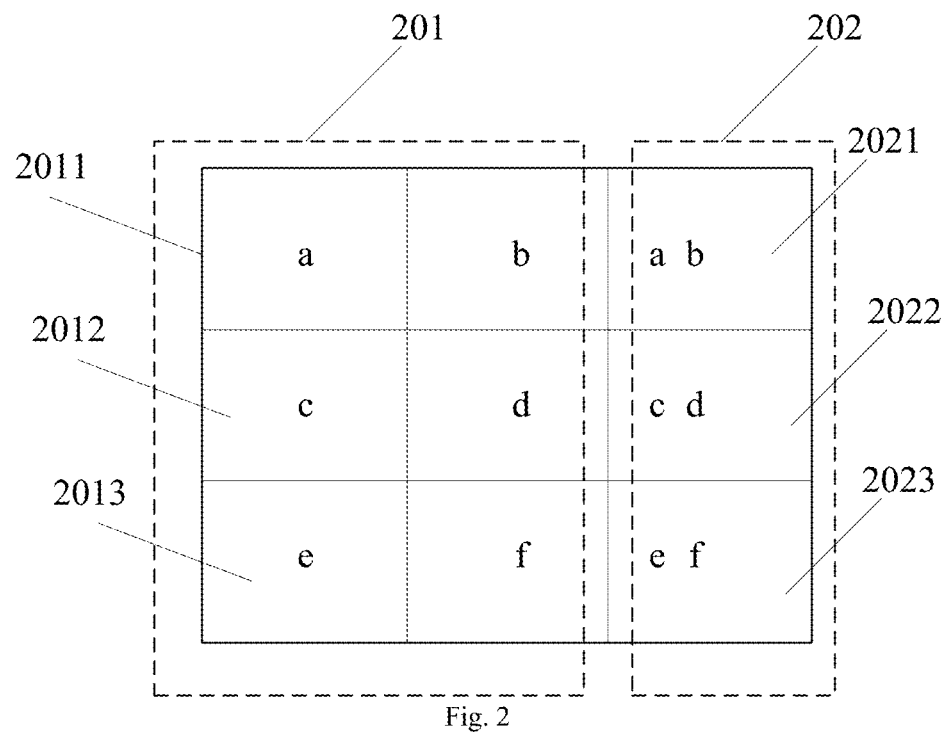
FIG. 2, FIGS. 3A-3B, and FIG. 4 are schematic diagrams of application scenarios of a data query method based on on-line analytical processing according to an embodiment of the present disclosure.

As an example, referring to FIG. 2, FIG. 2 illustrates a column-based storage portion 201 and a row-based storage portion 202 of the event table. The column-based storage portion may include a data row 2011, a data row 2012, and a data row 2013. The row-based storage portion may include a coding column, which may include coded information 2021, coded information 2022, and coded information 2023. It can be seen that the coded information 2021 may include field values (i.e., a and b) in the data row 2011, the coded information 2022 may include field values (i.e., c and d) in the data row 2012, and the coded information 2023 may include field values (i.e., e and f) in the data row 2013. Therefore, when being stored in a column-based manner, the coding column is stored in an order of abcdef, that is, the row-based storage is implemented.

Step 103, generating a query result based on retrieved target data.

Here, the front end and/or the back end of the database may generate the query result based on the retrieved target data.

It should be noted that according to the data processing method provided in this embodiment, in the event table of the database that adopts the column-based storage, the field values belonging to the same row are encoded into the coded information of the coding column, so that the row-based storage may be implemented in the event table that adopts the column-based storage. Therefore, for a query request conforming to the preset type, a query is executed in the row-based storage portion, thereby improving the query efficiency.

In some embodiments, the method further includes: executing a query in the column-based storage portion of the event table of the database in response to the request type not being a preset type.

Therefore, for a request with a high query complexity, a query may be executed in the column-based storage portion, thereby improving the processing efficiency. That is, for different types of requests (with different query complexities), a query is executed at different locations (the row-based storage portion or the column-based storage portion) in the event table, so that the query speed may be increased for the different requests.

In some embodiments, the coded information includes a data header, and the data header includes bitmap information, which is configured to indicate a location of a null value in the data rows of the column-based storage portion.

The bitmap information may indicate whether a null value is included in the data rows of the column-based storage portion and where the null value is located.

Figures 3A, 3B, 4, 5:
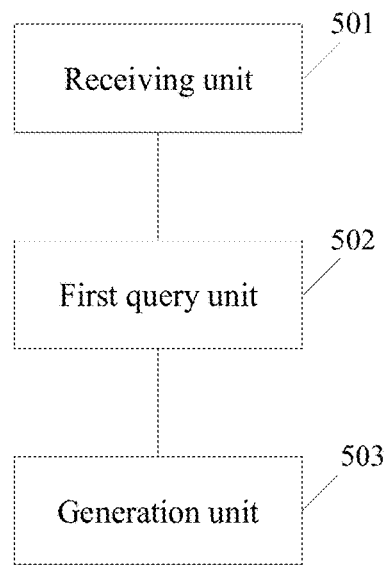
FIG. 5 is a schematic diagram of a structure of a data query apparatus based on on-line analytical processing according to an embodiment of the present disclosure.

As an example, referring to FIG. 3A and FIG. 3B, they illustrate a fixed-length coding model.

In the fixed-length coding model, there is no field length, only a fixed-length offset is obtained based on a schema length of a data type. In FIG. 3A and FIG. 3B, Version is used for inter-version adaptation; Column num is used to obtain a specific row number of the row data when a schema length changes (schema change); Null bitset is used to store columns in which there is a null value, and if there is a null value, it does not need to be stored in value coding, thereby reducing the storage space; and Col value indicates a specific field value, for example, Col1 value may indicate a field value of a first column.

As illustrated in FIG. 3A, a field value of a first column is 'a': a field value of a second column is 2; and a field value of a third column is 2.222.

As illustrated in FIG. 3B, a field value of a first column is 'a': a field value of a second column is a null value; and a field value of a third column is 2.222. Therefore, the null value in the data rows may occupy the storage space, which saves the number of storage controls, and improves the reading efficiency.

In some embodiments, the data header includes field lengths respectively corresponding to the row data in the data rows of the column-based storage portion.

As an example, referring to FIG. 4, FIG. 4 illustrates a variable-length coding model. The variable-length coding model includes field lengths, so that during column prune, an offset is calculated based on column field lengths (such as a length of a first column, a length of a second column, and a length of a third column), to implement data skip-reading. As illustrated in FIG. 4, a field length of a first column is 2, a field length of a second column is 4, and a field length of a third column is 4; and a field value of the first column is ab, a field value of the second column is 2, and a field value of the third column is 2.222.

Therefore, during the column prune, the offset is determined based on the field lengths, to implement data skip-reading.

In some embodiments, the data header includes a column number, which is configured to indicate the number of fields to which the row data in the column-based storage portion belongs.

As an example, referring to FIG. 4, FIG. 4 illustrates the column number (Column num).

In some embodiments, the executing a query in a row-based storage portion of an event table of a database in response to the request type being a preset type includes: in response to the request type being the preset type, searching for cached data related to the first query request from cached data in a database front end of the database; and in response to the related cached data being retrieved, executing a query based on the related cached data.

In some embodiments, a multi-level cache mechanism is provided. The cached data includes at least one of the following: a cached plan, a cached primary key, and a cached primary key value.

For example, a query plan is cached, which may be applied to a case where a type of a query request remains unchanged and its condition parameter changes, so as to reduce the amount of computation used for generating the query plan on the FE side, thereby increasing the speed of determining the query plan, and further increasing the query speed.

For example, data is cached, and the cached data may include a cached primary key and a cached primary key value. With different query requests for a same primary key, the query speed can be increased.

In some embodiments, the executing a query in a row-based storage portion of an event table of a database in response to the request type being a preset type includes: executing a query for data in the event table by means of a remote procedure call during execution of a database back end of the database.

Data is read from or written into the event table through a data interface by means of the remote procedure call (RPC). In the RPC, a caller (such as the database back end) sends a request message to a storage node, which then receives the request, executes a corresponding program and returns a result to the caller.

Therefore, an execution of task scheduling path in the BE may be avoided, thereby increasing the processing speed for the request.

In some embodiments, the executing a query in a row-based storage portion of an event table of a database in response to the request type being a preset type includes: obtaining metadata from an external storage space of a database front end of the database; and determining, based on the obtained metadata, a location of a target field value corresponding to the first query request in the event table.

Metadata management, which is originally done in the FE, can be transferred to a storage space outside the FE, thereby releasing a restrictive relationship between master and slave nodes of the FE. Therefore, information having a status can be stored outside the master and slave nodes of the FE, so that the query request does not need to be bound to the FE, and in a scenario of high-frequency operations (such as insert or update operations), there is no bottleneck limitation in the performance of the FE, thereby improving the operation efficiency.

In some embodiments, the method further includes: if the first query request is bound to an operation request, executing, according to the operation request, an operation on a target field value retrieved in the event table.

Operations of certain types, such as an update operation, a delete operation or an insert operation, may be bound to a query operation. Based on the first query request, the request is processed by using the method provided in the embodiment of the present disclosure, and then an operation is performed on the target field value, so that the operation efficiency can be improved.

Further, referring to FIG. 5, as an implementation of the method shown in the figures described above, the present disclosure provides an embodiment of a data query apparatus based on on-line analytical processing. The apparatus embodiment corresponds to the method embodiment shown in FIG. 1, and the apparatus may be applied to various electronic devices, for example.

As shown in FIG. 5, the data query apparatus based on on-line analytical processing in this embodiment includes: a receiving unit 501, a first query unit 502, and a generation unit 503. The receiving unit is configured to receive a first query request, and determine a request type of the first query request. The first query unit is configured to execute a query in a row-based storage portion of an event table of a database in response to the request type being a preset type. The generation unit is configured to generate a query result based on retrieved target data. The event table includes a column-based storage portion and the row-based storage portion, and the column-based storage portion includes a plurality of data rows; and the row-based storage portion includes a coding column, and each piece of coded information in the coding column includes row data belonging to a same data row in the column-based storage portion.

In this embodiment, for the specific processing of the receiving unit 501, the first query unit 502, and the generation unit 503 of the data query apparatus based on on-line analytical processing, as well as the technical effects thereof, reference may be made to the related descriptions of step 101, step 102, and step 103 in the corresponding embodiment of FIG. 1, respectively, which are not repeated herein.

In some embodiments, the encoded information includes a data header, and the data header includes bitmap information, which is configured to indicate a location of a null value in the data rows of the column-based storage portion.

In some embodiments, the data header includes field lengths respectively corresponding to the row data in the data rows of the column-based storage portion.

In some embodiments, the data header includes a column number, which is configured to indicate a number of fields to which the row data in the column-based storage portion belongs.

In some embodiments, the executing a query in a row-based storage portion of an event table of a database in response to the request type being a preset type includes: in response to the request type being the preset type, searching for cached data related to the first query request from cached data in a database front end of the database; and in response to the related cached data being retrieved, executing a query based on the related cached data.

In some embodiments, the cached data includes at least one of the following: a cached plan, a cached primary key, and a cached primary key value.

In some embodiments, the executing a query in a row-based storage portion of an event table of a database in response to the request type being a preset type includes: executing a query for data in the event table by means of a remote procedure call during execution of a database back end of the database.

In some embodiments, the executing a query in a row-based storage portion of an event table of a database in response to the request type being a preset type includes: obtaining metadata from an external storage space of a database front end of the database; and determining, based on the obtained metadata, a location of a target field value corresponding to the first query request in the event table.

In some embodiments, the data query apparatus further includes: an operation unit (not shown in this figure) configured to execute, according to an operation request, an operation on a target field value retrieved in the event table in response to the first query request being bound to the operation request.

In some embodiments, the data query apparatus further includes: a second query unit (not shown in this figure) configured to execute a query in the column-based storage portion of the event table of the database in response to the request type not being a preset type.

Figure 6:
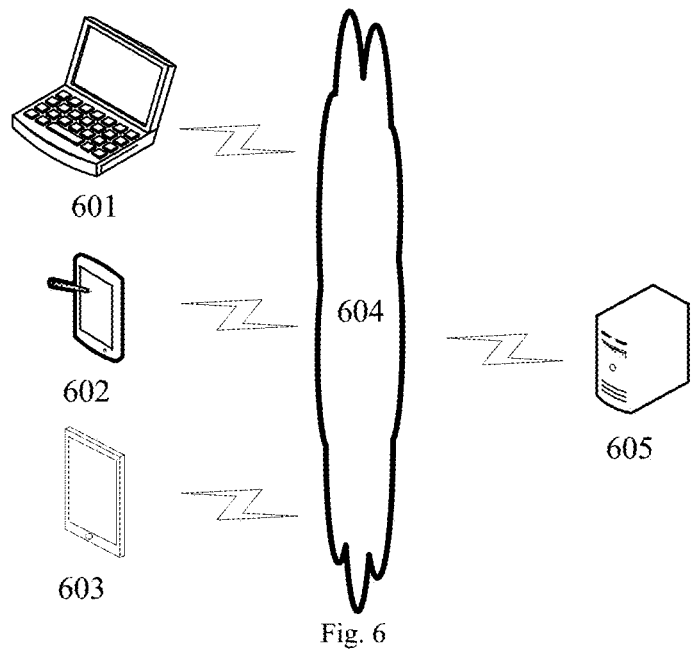
FIG. 6 illustrates an exemplary system architecture in which a data query method based on on-line analytical processing according to an embodiment of the present disclosure may be applied.

Referring to FIG. 6, FIG. 6 illustrates an exemplary system architecture in which a data query method based on on-line analytical processing according to an embodiment of the present disclosure may be applied.

As shown in FIG. 6, the system architecture may include terminal devices 601, 602, and 603, a network 604, and a server 605. The network 604 is configured as a medium to provide a communication link between the terminal devices 601, 602, 603 and the server 605. The network 604 may include a variety of connection types, such as wired or wireless communication links, or optical fiber cables.

The terminal devices 601, 602, and 603 may interact with the server 605 via the network 604, to receive or send messages, etc. The terminal devices 601, 602, and 603 may have various client applications installed thereon, such as a web browser application, a search application, and a news information application. The client applications in the terminal devices 601, 602, and 603 may receive an instruction of a user, and complete a corresponding function according to the instruction of the user, such as adding corresponding information to information according to the instruction of the user.

The terminal devices 601, 602, and 603 may be in the form of hardware or software. When the terminal devices 601, 602, and 603 are in the form of hardware, they may be various electronic devices having a display screen and supporting web browsing, including, but not limited to, a smartphone, a tablet computer, an e-book reader, a Moving Picture Experts Group Audio Layer III (MP3) player, a Moving Picture Experts Group Audio Layer IV (MP4) player, a laptop computer, a desktop computer, etc. When the terminal devices 601, 602, and 603 are in the form of software, they may be installed in the electronic devices listed above. The terminal devices may be implemented as a plurality of pieces of software or software modules (for example, software or software modules used to provide distributed services), or may be implemented as a single piece of software or software module. This is not limited herein.

The server 605 may be a server that provides various services, such as receiving an information acquisition request sent by the terminal devices 601, 602 and 603, and obtaining display information corresponding to the information acquisition request according to the information acquisition request in various manners. Data related to the display information is sent to the terminal devices 601, 602 and 603.

It should be noted that the data query method based on on-line analytical processing provided in the embodiment of the present disclosure may be executed by a terminal device, and accordingly, the data query apparatus based on on-line analytical processing may be provided in the terminal devices 601, 602, and 603. In addition, the data query method based on on-line analytical processing provided in the embodiment of the present disclosure may also be executed by the server 605, and accordingly, the data query apparatus based on on-line analytical processing may be provided in the server 605.

It should be understood that the number of terminal devices, networks, and servers in FIG. 6 is merely illustrative. There may be any number of terminal devices, networks, and servers, depending on the needs of implementation.

Figure 7:
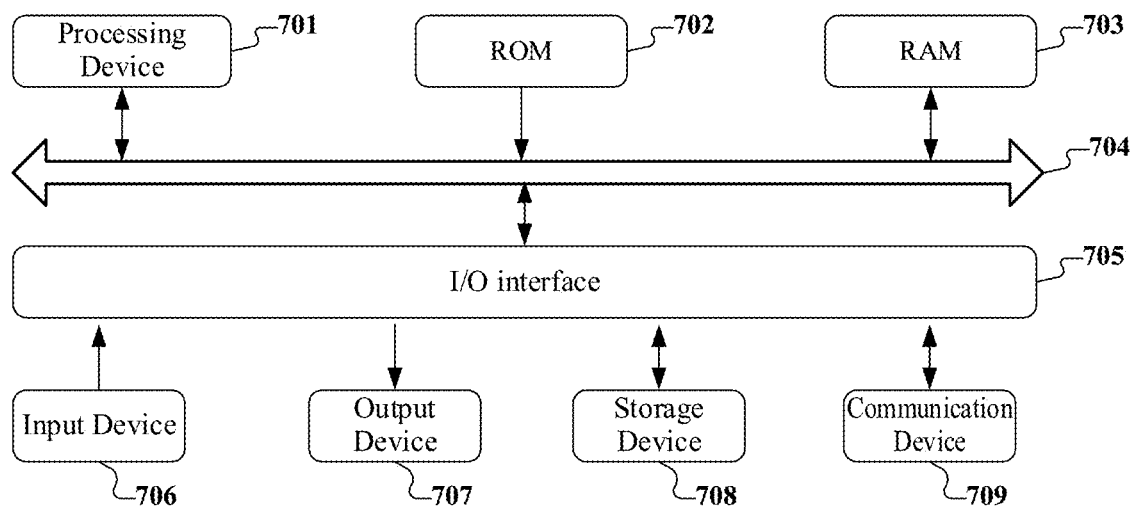
FIG. 7 is a schematic diagram of a basic structure of an electronic device according to an embodiment of the present disclosure.

Reference is made to FIG. 7 below, which is a schematic diagram of a structure of an electronic device (such as a terminal device or a server in FIG. 6) suitable for implementing an embodiment of the present disclosure. The terminal device in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital TV and a desktop computer. The electronic device shown in FIG. 7 is merely an example, and shall not impose any limitation on the function and scope of use of the embodiments of the present disclosure.

As shown in FIG. 7, the electronic device may include a processing device (e.g., a central processor, a graphics processor, etc.) 701 that may perform a variety of appropriate actions and processing in accordance with a program stored in a read-only memory (ROM) 702 or a program loaded from a storage device 708 into a random-access memory (RAM) 703. The RAM 703 further stores various programs and data required for the operation of the electronic device 700. The processing device 701, the ROM 702, and the RAM 703 are connected to each other through a bus 704. An input/output (I/O) interface 705 is also connected to the bus 704.

Generally, the following devices may be connected to the I/O interface 705: an input device 706 including, for example, a touchscreen, a touchpad, a keyboard, a mouse, a camera, a microphone, an accelerometer, a gyroscope, etc.; an output device 707 including, for example, a liquid crystal display (LCD), a speaker, a vibrator, etc.; the storage device 708 including, for example, a magnetic tape, a hard disk, etc.; and a communication device 709. The communication device 709 may allow the electronic device to perform wireless or wired communication with other devices to exchange data. Although FIG. 7 shows the electronic device having various devices, it should be understood that it is not required to implement or have all of the shown devices. It may be an alternative to implement or have more or fewer devices.

In particular, according to an embodiment of the present disclosure, the process described above with reference to the flowchart may be implemented as a computer software program. For example, this embodiment of the present disclosure includes a computer program product, which includes a computer program carried on a non-transitory computer-readable medium, where the computer program includes program code for executing the method shown in the flowchart. In such an embodiment, the computer program may be downloaded and installed from a network through the communication device 709, installed from the storage device 708, or installed from the ROM 702. When the computer program is executed by the processing device 701, the above-mentioned functions defined in the method of the embodiment of the present disclosure are performed.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, a client and a server may communicate using any currently known or future-developed network protocol such as the Hypertext Transfer Protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs that, when executed by the electronic device, cause the electronic device to: receive a first query request, and determine a request type of the first query request; execute a query in a row-based storage portion of an event table of a database in response to the request type being a preset type; and generate a query result based on retrieved target data, where the event table includes a column-based storage portion and the row-based storage portion, and the column-based storage portion includes a plurality of data rows; and the row-based storage portion includes a coding column, and each piece of coded information in the coding column includes row data belonging to a same data row in the column-based storage portion.

Computer program code for executing operations of the present disclosure can be written in one or more programming languages or a combination thereof, where the programming languages include but are not limited to object-based programming languages, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving a remote computer, the remote computer may be connected to a computer of a user over any type of network, including a local area network (LAN) or a wide area network (WAN), or may be connected to an external computer (for example, connected over the Internet using an Internet service provider).

The flowchart and block diagram in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by software, or may be implemented by hardware. Names of the units do not constitute a limitation on the units themselves in some cases, for example, a receiving unit may alternatively be described as "a unit for receiving a request".

The functions described herein above may be performed at least partially by one or more hardware logic components.

For example, without limitation, exemplary types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

The foregoing descriptions are merely preferred embodiments of the present disclosure and explanations of the applied technical principles. Those skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features with similar functions disclosed in the present disclosure (but not limited thereto) also falls within the scope of the present disclosure.

In addition, although the various operations are depicted in a specific order, it should not be understood as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable sub-combination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

The invention claimed is:

1. A data query method based on on-line analytical processing, comprising:
    creating an event table in a database, wherein the event table comprises a column-based storage portion and a row-based storage portion adjacent to the column-based storage portion, wherein the column-based storage portion comprises a plurality of data rows, and wherein the row-based storage portion comprises a coding column;
    encoding information stored in each of the plurality of data rows of the column-based storage portion into a corresponding row in the coding column;
    receiving a first SQL query request, and parsing the first SQL query request to determine that the first SQL query request is associated with a first query complexity level;
    executing a first SQL query in the row-based storage portion of the event table in response to determining that the first SQL query request is associated with the first query complexity level;
    generating a query result based on retrieved target data;
    receiving a second SQL query request, and parsing the second SQL query request to determine that the second SQL query request is associated with a second query complexity level, wherein the second query complexity level is higher than the first query complexity level; and
    executing a second SQL query in the column-based storage portion of the event table in response to determining that the second SQL query request is associated with the second query complexity level.

2. The method according to claim 1, wherein the encoded information comprises a data header and field value information, and the field value information comprises the row data belonging to a same data row in the column-based storage portion; and
    the data header comprises bitmap information, which is configured to indicate a location of a null value in the plurality of data rows of the column-based storage portion.

3. The method according to claim 2, wherein
    the data header comprises field lengths respectively corresponding to row data in the plurality of data rows of the column-based storage portion.

4. The method according to claim 3, wherein
    the data header comprises a column number, which is configured to indicate a number of fields to which the row data in the column-based storage portion belongs.

5. The method according to claim 1, wherein the executing the first SQL query in the row-based storage portion of the event table in response to determining that the first SQL query request is associated with the first query complexity level comprises:
    searching for cached data related to the first SQL query request from cached data in a database front end of the database; and
    in response to the related cached data being retrieved, executing the first SQL query based on the related cached data.

6. The method according to claim 5, wherein the cached data comprises at least one of a cached plan, a cached primary key, and a cached primary key value.

7. The method according to claim 1, wherein the executing the first SQL query in the row-based storage portion of the event table in response to determining that the first SQL query request is associated with the first query complexity level comprises:
    executing a query for data in the event table by means of a remote procedure call during execution of a database back end of the database.

8. The method according to claim 1, wherein the executing the first SQL query in the row-based storage portion of the event table in response to determining that the first SQL query request type is associated with the first query complexity level comprises:
    obtaining metadata from an external storage space of a database front end of the database; and
    determining, based on the obtained metadata, a location of a target field value corresponding to the first SQL query request in the event table.

9. The method according to claim 1, further comprising:
    in response to the first SQL query request being bound to an operation request, executing, according to the operation request, an operation on a target field value retrieved in the event table.

10. An electronic device, comprising:
    one or more processors; and
    a storage device configured to store one or more programs, wherein
    the one or more programs, when executed by the one or more processors, cause the one or more processors to implement a data query method based on on-line analytical processing, comprising:
    creating an event table in a database, wherein the event table comprises a column-based storage portion and a row-based storage portion adjacent to the column-based storage portion, wherein the column-based storage portion comprises a plurality of data rows, and wherein the row-based storage portion comprises a coding column;
    encoding information stored in each of the plurality of data rows of the column-based storage portion into a corresponding row in the coding column;
    receiving a first SQL query request, and parsing the first SQL query request to determine that the first SQL query request is associated with a first query complexity level;
    executing a first SQL query in the row-based storage portion of the event table in response to determining that the first SQL query request is associated with the first query complexity level;
    generating a query result based on retrieved target data;
    receiving a second SQL query request, and parsing the second SQL query request to determine that the second SQL query request is associated with a second query complexity level, wherein the second query complexity level is higher than the first query complexity level; and
    executing a second SQL query in the column-based storage portion of the event table in response to determining that the second SQL query request is associated with the second query complexity level.

11. The electronic device according to claim 10, wherein in the data query method based on on-line analytical processing,
    the encoded information comprises a data header and field value information, and the field value information comprises the row data belonging to a same data row in the column-based storage portion; and
    the data header comprises bitmap information, which is configured to indicate a location of a null value in the plurality of data rows of the column-based storage portion.

12. The electronic device according to claim 11, wherein in the data query method based on on-line analytical processing,
    the data header comprises field lengths respectively corresponding to row data in the plurality of data rows of the column-based storage portion.

13. The electronic device according to claim 12, wherein in the data query method based on on-line analytical processing,
    the data header comprises a column number, which is configured to indicate a number of fields to which the row data in the column-based storage portion belongs.

14. The electronic device according to claim 10, wherein in the data query method based on on-line analytical processing,
    the executing the first SQL query in the row-based storage portion of the event table in response to determining that the first SQL query request is associated with the first query complexity level comprises:
    searching for cached data related to the first SQL query request from cached data in a database front end of the database; and
    in response to the related cached data being retrieved, executing the first SQL query based on the related cached data.

15. The electronic device according to claim 14, wherein in the data query method based on on-line analytical processing,
    the cached data comprises at least one of a cached plan, a cached primary key, and a cached primary key value.

16. The electronic device according to claim 10, wherein in the data query method based on on-line analytical processing,
    the executing the first SQL query in the row-based storage portion of the event table in response to determining that the first SQL query request is associated with the first query complexity level comprises:
    executing a query for data in the event table by means of a remote procedure call during execution of a database back end of the database.

17. The electronic device according to claim 10, wherein in the data query method based on on-line analytical processing,
    the executing the first SQL query in the row-based storage portion of the event table in response to determining that the first SQL query request is associated with the first query complexity level comprises:
    obtaining metadata from an external storage space of a database front end of the database; and
    determining, based on the obtained metadata, a location of a target field value corresponding to the first SQL query request in the event table.

18. The electronic device according to claim 10, wherein the data query method based on on-line analytical processing further comprises:
    in response to the first SQL query request being bound to an operation request, executing, according to the operation request, an operation on a target field value retrieved in the event table.

19. A non-transitory computer-readable storage medium having a computer program stored thereon, wherein when the program is executed by a processor, a data query method based on on-line analytical processing is implemented, comprising:
    creating an event table in a database, the event table comprising a column-based storage portion and a row-based storage portion, wherein the column-based storage portion comprises a plurality of data rows, and wherein the row-based storage portion comprises a coding column;
    encoding row data stored in each of the plurality of data rows of the column-based storage portion into a corresponding row in the coding column;

receiving a first SQL query request, and parsing the first SQL query request to determine that a request type of the first SQL query request is a preset type;

executing a first SQL query in the row-based storage portion of the event table in response to determining that the request type of the first SQL query request is the preset type;

generating a query result based on retrieved target data;

receiving a second SQL query request, and parsing the second SQL query request to determine that a request type of the second SQL query request is not the preset type; and executing a second SQL query in the column-based storage portion of the event table in response to determining that the request type of the second SQL query request is not the preset type.

* * * * *